United States Patent [19]
Suzuki et al.

[11] Patent Number: 5,229,173
[45] Date of Patent: Jul. 20, 1993

[54] METHOD OF PRODUCING A MAGNETIC RECORDING MEDIA

[75] Inventors: Hiroshi Suzuki, Higashiosaka; Tousaku Nishiyama, Katano; Masaki Hirokoh, Kobe; Tsumoru Ohata, Katano, all of Japan

[73] Assignee: Matsushita Electric Industrial Co., Ltd., Osaka, Japan

[21] Appl. No.: 933,006

[22] Filed: Aug. 21, 1992

Related U.S. Application Data

[63] Continuation-in-part of Ser. No. 678,935, Apr. 3, 1991, abandoned.

[51] Int. Cl.$^5$ ................................ B05D 3/14
[52] U.S. Cl. .................... 427/549; 427/128; 427/130; 427/132; 427/348; 427/349; 427/378; 427/383.1; 427/385.5; 427/550; 427/599
[58] Field of Search .............. 427/48, 128–132, 427/549, 348, 349, 378, 383.1, 385.5, 550, 599; 428/694, 695, 900

[56] References Cited

U.S. PATENT DOCUMENTS

| | | | |
|---|---|---|---|
| 2,796,359 | 6/1957 | Speed | 427/48 |
| 3,256,112 | 6/1966 | Camras | 117/93.2 |
| 4,271,782 | 6/1981 | Bate et al. | 427/48 X |
| 4,518,626 | 5/1985 | Kato et al. | 427/48 |

FOREIGN PATENT DOCUMENTS

| | | |
|---|---|---|
| 2444971 | 4/1976 | Fed. Rep. of Germany . |
| 56-36496 | 8/1981 | Japan . |
| 59-71133 | 4/1984 | Japan . |
| 60-70532 | 4/1985 | Japan . |
| 60-76023 | 4/1985 | Japan . |
| 61-267933 | 11/1986 | Japan . |

*Primary Examiner*—Bernard Pianalto
*Attorney, Agent, or Firm*—Wenderoth Lind & Ponack

[57] ABSTRACT

A method of producing a coated magnetic recording medium includes a step of coating a nonmagnetic substrate with a magnetic paste layer mainly composed of acicular or granular magnetic particles and a resin binder, a spontaneous drying step for a specific period for inducing leveling of the coated surface and spontaneous volatilization of solvent without applying a magnetic field from outside after coating the magnetic paint, a first orientation step for dissipating the aggregated particles by a sudden change in magnetic field while inducing magnetic moment in magnetic particles by a strong DC magnetic field inside the coated surface and in a longitudinal direction of the medium for arraying the magnetic particles in the coated surface in the longitudinal direction, and a succeeding second orientation step for suppressing the magnetic repulsive force among the particles while arraying the magnetic particles by a DC magnetic field in the coated surface in the longitudinal direction.

5 Claims, 2 Drawing Sheets

METHOD OF PRODUCING A MAGNETIC RECORDING MEDIA

This application is a continuation-in-part of now abandoned application Ser. No. 07/678,935, filed Apr. 3, 1991, now abandoned.

BACKGROUND OF THE INVENTION

1. Field of the Invention

The present invention relates to a magnetic recording medium in a tape form to be used in video and audio appliances or information related equipment. More specifically, the invention relates to a method for manufacturing a coated type magnetic recording medium possessing an excellent surface smoothness and a high squareness ratio in the longitudinal direction of the tape, in order to realize a high orientation by the minimum limit of equipment and power by the most effective orientation technique.

2. Description of the Prior Art

Various recording media are presently subject to a demand that the recording and reproducing characteristics in high density recording region be enhanced along with the trend of high picture quality, digital processing of signals, down-sizing of appliances, and high speed processing.

In a coated magnetic recording medium, the key for improving the recording and reproducing characteristics in the high frequency region is to enhance the magnetic characteristics of the medium layer and smooth the medium surface. Enhancing the magnetic characteristics is intended to increase the magnetic intensity of recorded signals. Smoothing the medium surface is intended to lessen the spacing loss occurring at the time of recording and reproducing by suppressing the gap between the record/play head and magnetic particles as far as possible at the medium side.

In such background, in the field of recording materials, those with higher magnetic energy have been studied, and iron oxide particles with improved coercive force by coating with Co and alloy particles high in saturated magnetization and coercive force are becoming the main type.

In the aspect of the process for applying and forming the shape of a magnetic particles and magnetic layer, research has been conducted into the technique for raising the packing density of the magnetic layer by reducing the sizes of the magnetic particles, lowering the axial ratio, and optimizing the composition ratio of the magnetic layer, a technique for aligning the array directions of magnetic particles in the machine direction to the limit by fortifying the orientation process, and a technique for optimizing the calendering conditions at the time of forming the magnetic layer and glass transition temperature of the binder resin.

Along with the improvement of magnetic particles, however, as the coercive force is increased, it is necessary to intensify the external magnetic field for fixing the magnetic moment in the initial phase of orientation in the easy magnetization axis direction, or when the saturated magnetization is increased, the magnetic repulsive force among magnetic particles tends to increase when arrayed. Besides, reduction of particle size brings about decrease of distance between particles after coating or in the paint state, and lowering of the axial ratio leads to a decrease of magnetic anisotropic energy of particles.

Thus, magnetic and morphological improvements of magnetic particles act negatively for obtaining an excellent squareness ratio. In the prior art, it has been attempted to cope with the higher coercive force, lower axial ratio and stronger repulsive force among particles by early drying of the coated film during the orientation process as well as by a powerful orientation magnetic field. As examples, various efforts have been made such as, further advancing the known art of orientation processing while drying (Japanese Laid-open Patent No. 59-71133), orientation after drying to such an extent that reaggregation does not occur magnetically, and then re-drying (Japanese Laid-open Patent No. 56-36496), or magnetic orientation means installed in the drying process (Japanese Laid-open Patent No. 60-70532), or preliminary orientation and drying followed by intermediate drying with simultaneous regular orientation, and then regular drying (Japanese Laid-open Patent No. 60-76023).

To obtain superior surface properties, a smooth and homogeneous coated film is required before calendering, and indispensable conditions are an orientation process and drying process which will not to cause roughness of the coated surface, as well as sufficient leveling after applying magnetic paints. In the conventional method, therefore, although the orientation may be improved, the coated film surface after drying is not excellent, and it is difficult to enhance the surface smoothness of the final magnetic layer.

SUMMARY OF THE INVENTION

It is hence a primary object of the invention to present a producing method of a magnetic recording medium possessing a high squareness ratio without roughing the surface of the medium even by using magnetic particles of very small particle size and large saturated magnetization and coercive force, with the purpose of recording and reproducing signals in the high density recording region.

To achieve the above object, the method of the invention comprises three steps, namely, a spontaneous drying step for applying and forming a magnetic layer mainly composed of acicular or granular magnetic particles and resin type binder on a non-magnetic substrate, and inducing leveling of the coated surface and spontaneous volatilization of solvent without applying a magnetic field from outside, a first orientation step for loosening the aggregation of particles by a sudden change of magnetic field while inducing a magnetic moment in the magnetic particles by a strong DC magnetic field inside the coated layer and in the machine direction, and a second orientation step for suppressing the magnetic repulsive force among particles while arraying the magnetic particles by a DC magnetic field inside the coated layer and in the longitudinal direction.

By intentionally providing the spontaneous drying step before the first orientation step, leveling of the coated surface and spontaneous volatilization of solvent are brought about, and it is effective for preventing the magnetic particles from moving within the coat film when a strong magnetic field is applied in the first orientation step. Besides, since the leveling time after forming film is sufficient, undulations of the coated film not made completely uniform in the coating step may be lessened. By these effects, roughing of the coated layer surface due to magnetic field orientation is prevented, while the coated film surface is improved. Supposing here the manufacturing conditions for obtaining a general composition of the coated magnetic recording medium, it is desired to take about 2 to 7 seconds in the spontaneous drying step. This time is to assume the nonvolatile ratio of magnetic paint of 25% or more and 45% or less at the time of coating, with the coated layer thickness after drying of 1.0 to 5.0 μm.

In the first orientation step, by applying a strong DC magnetic field in the machine direction, a magnetic moment is built up on the magnetic particles facing in arbitrary directions, and then orientation is effected in the direction of the magnetic field with a powerful torque. The torque applied to the particles at this time acts as a shearing force, which acts to effectively separate from each other the particles which have been reaggregated due to spontaneous magnetization after dispersion treatment of the paint.

The magnetic field intensity required in the first orientation step is very strong, considering the ultrafine particles of magnetic powder and the tendency of higher coercive force and lower axial ratio, and it is desired to be at least three times or more than the coercive force of magnetic particles in a powder state. The reason is that the magnetic moment cannot be excited effectively if the maximum magnetic field is less than 3 times the coercive force when the hard magnetization axis of magnetic particles is facing the direction of the magnetic field in the initial state before orientation.

The time of applying the strong magnetic field in the first orientation step should not be longer than required, and it is desired to be within 0.5 second when the magnetic field intensity is more than 3 times the coercive force of magnetic particles. If longer, the magnetic coated layer begins to become fluid, and the smoothness and orientation uniformity of the coated layer obtained by making use of leveling performance are sacrificed, and the surface smoothness after drying is impaired.

In the second orientation step, by applying a DC magnetic field within the coated layer and in the longitudinal direction, it is intended to suppress the magnetic repulsive force among magnetic particles about to face the magnetic direction as the magnetic moment is excited in the first orientation step, and array them precisely in the machine direction. As the degree of array of magnetic particles is enhanced, the magnetic repulsive force increases, and therefore the minimum magnetic field intensity is desired to be ½ or more of the coercive force of the magnetic particles in powder state and last for at least 2 seconds. At the beginning of the second orientation step, the upper limit of the magnetic field intensity should be less than three times the coercive force of the magnetic particles. Thereafter the upper limit can be increased to a value of from three to five times the coercive force of the magnetic particles. Further, if the maximum magnetic field intensity in the area of the second orientation step is three to five times the coercive force of magnetic particles, disorder of magnetic particles after ordering them in the first orientation step can be suppressed. However, if the maximum magnetic field intensity in the area of the second orientation step is more than five times the coercive force of magnetic particles, magnetic particles will begin to move and impairment of the surface smoothness will be caused.

As the external magnetic field to be applied in the second orientation step, considering the constant of magnetic field intensity or levelness of the magnetic field, it is most desired to make use of the horizontal magnetic field obtained by passing a stable DC current in a solenoid coil.

Besides, from the end of first orientation step until the end of the second orientation step, plural air nozzles are installed, and hot air set at a temperature and flow rate which will not roughen the surface of the coated layer by drying is blown on the coated surface, and the repulsive force among magnetic particles is canceled by the viscosity rise of the coated layer, so that the orientation will be maintained more effectively.

Owing to such effects, in the invention, it is possible to obtain magnetic recording media having both an excellent in squareness ratio in the longitudinal direction and surface smoothness that can not be realized by the conventional method by using magnetic particles of high coercive force and low axial ratio. The read/write characteristics of the media obtained by the invention can exhibit a the high record/playback performance in high density recording region.

DESCRIPTION OF THE PREFERRED EMBODIMENTS

Figure 1:
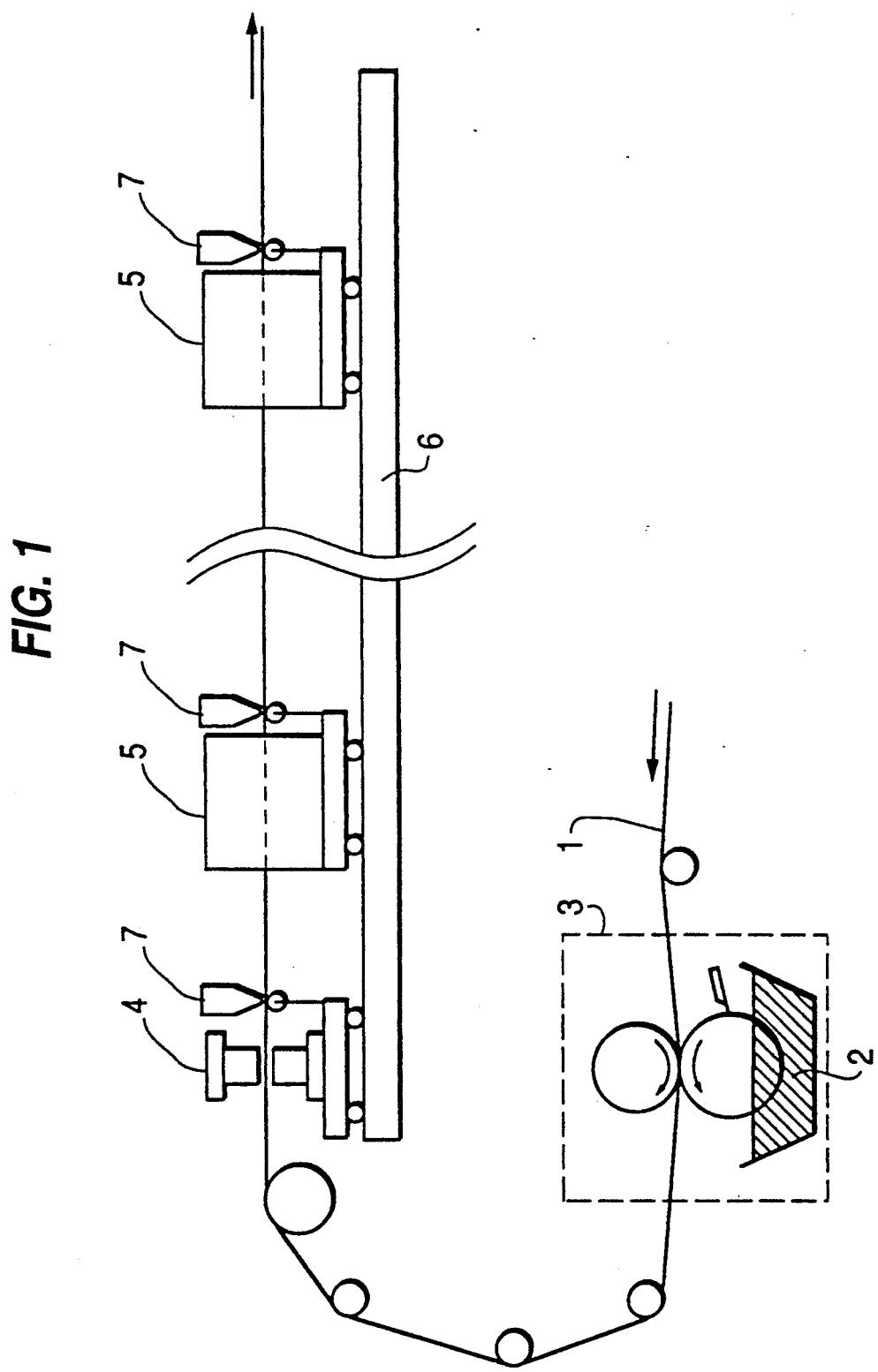
FIG. 1 is a structural diagram showing manufacturing equipment in an embodiment of the invention.
Figure 2:
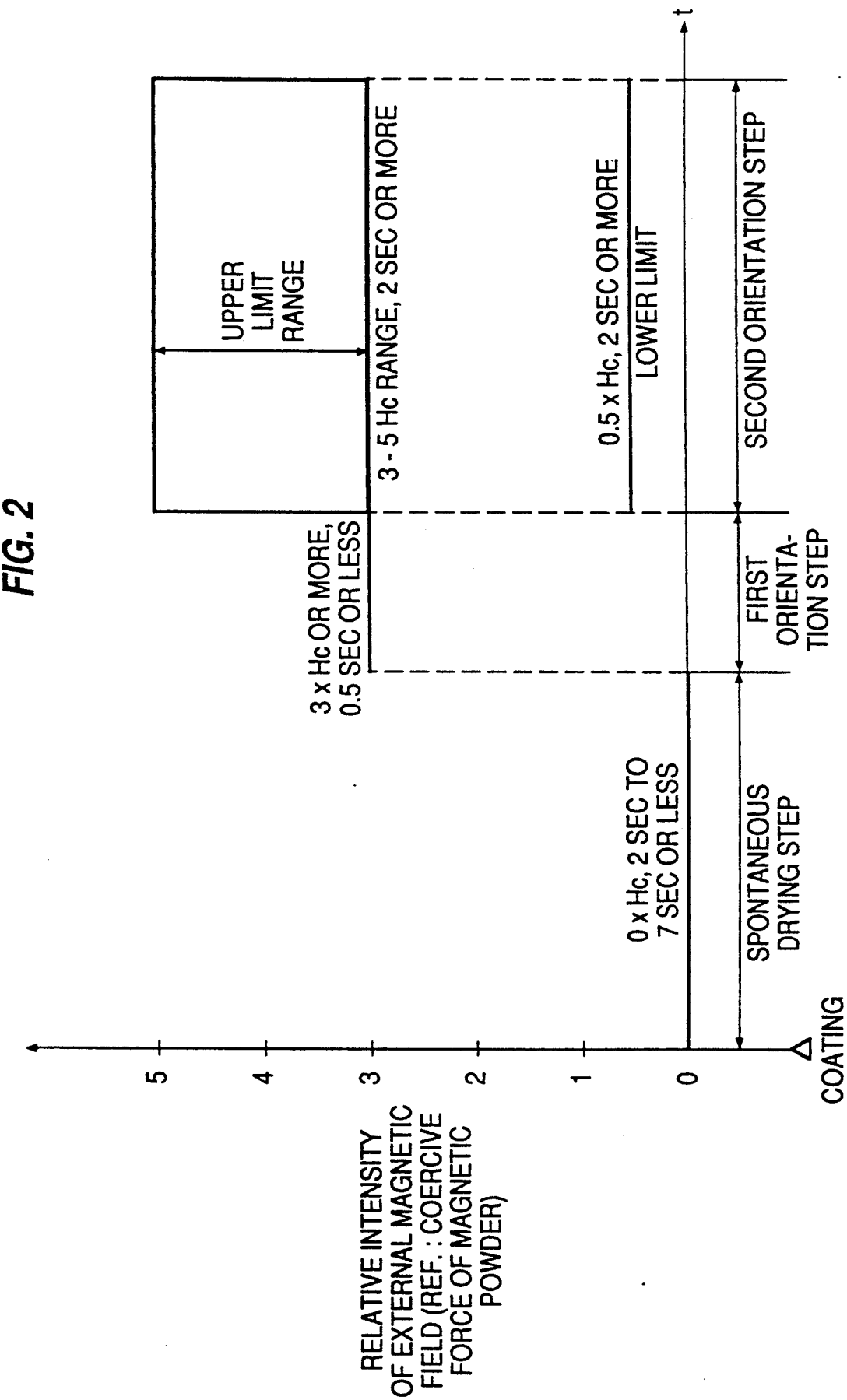
FIG. 2 is a chart relating to a method for applying an external magnetic field in a preferred embodiment of the invention.

FIG. 1 shows manufacturing equipment for magnetic tape according to an embodiment of the invention. Numeral 1 denotes a nonmagnetic substrate. Numeral 2 denotes magnetic paint. Numeral 3 designates a coating machine for applying magnetic paint on the nonmagnetic substrate. Numeral 4 designates a permanent magnet unit. Numeral 5 designates a magnetic field generator made of a solenoid coil. Numeral 6 denotes orientation system support rails for supporting the permanent magnet until 4 and magnetic field generator 5. Numeral 7 denotes an air nozzle.

The nonmagnetic substrate 1 is made of paper, glass, aluminum, or other nonmagnetic metal, ceramics, etc. and in particular preferred materials are polyesters such as polyethylene terephthalate and polyethylene-2,6-naphthalate, polyolefins such as polyethylene and polypropylene, cellulose derivatives such as cellulose acetate cellulose diacetate, cellulose acetate butylate and cellulose acetate propionate, vinyl resins such as polyvinyl chloride and polyvinylidene chloride, and plastic films such as polycarbonate, polyimide, polyetherimide and polyimide amide, which have excellent surface properties, durability and flexibility and are generally used in tape-shaped media. In the embodiment polyethylene terephthalate film is used which is used in high definition VTR and is known to have superior surface smoothness.

The magnetic paint 2 is prepared by kneading magnetic powder, binder, nonmagnetic solid fine particles, and other desirable materials together with a solvent. The magnetic powder is mainly composed of magnetic materials such as acicular gamma iron oxide ($\gamma$-$Fe_2O_3$), chromium oxide ($CrO_2$), acicular metal powder (Fe), iron carbide (FeC), iron nitride (FeN), ferrite, and barium ferrite, and other elements may be added as required. As the binder, thermoplastic resins are used, for example, polyurethane, vinyl chloride-vinyl acetate copolymer, cellulose derivative, urethane elastomer, and nitrocellulose polyamide resin. Nonmagnetic solid fine particles are added mainly for enhancing the conductivity, polishing property, lubricity, and durability, and specifically fused alumina, silicon carbide, chromium oxide, diamond, corundum, graphite, molybdenum disulfide, tungsten disulfide, carbon black and others are used. Examples of the solvent include acetone, methylethylketone, methylisobutylketone, cyclohexane and other ketones; methanol, ethanol, propanol, butanol and other alcohols; methyl acetate, ethyl acetate, butyl acetate and other acetic acids; and benzene, toluene, xylene and other aromatic hydrocarbons are used either alone or in mixed state. Besides, as a dispersant, lubricant and stabilizer, myristic acid, stearic acid, oleic acid, linolic acid, linolenic acid and other organic agents of low molecular weight may be added. These materials are added, generally to 100 parts by weight of magnetic powder, 16 to 30 parts by weight of binder, and 1 to 10 parts by weight of other additives, and the nonvolatile content of the dispersed paint is adjusted to be 25% to 80%, and the magnetic paint is obtained by the process of kneading and dispersing. As the method of kneading and dispersing, a ball mill or sand mill may be used, and many other general methods are mentioned in "Paint Flow and Pigment Dispersion" by T. C. Patton, and these methods may be employed for kneading and dispersing.

In the embodiment, a paint using alloy magnetic powder is used in forming the magnetic layer.

The coating machine 3 is generally a gravure coater, but other machines may be also used, for example, an air doctor coater, blade coater, air knife coater, kiss coater or die coater mentioned in "Coating Engineering" published by Asakura Shoten in 1971. In the embodiment, a gravure coater is used to apply the magnetic paint on the non-magnetic substrate. Afterwards, according to the producing method of the invention, orientation is effected, which is followed by drying, calendering and curing.

The permanent magnet unit 4 is composed of two permanent magnets with the same poles confronting each other. As permanent magnets, general manganese bismuth magnets, manganese aluminum magnets, ferrite magnets, and samarium cobalt, yttrium cobalt and cerium cobalt magnets mainly composed of rare earth elements may be used. In the embodiment, permanent magnets of samarium cobalt known to be high in spontaneous magnetization are used, and a maximum horizontal magnetic field of 8,000 Gauss is achieved.

The magnetic field generator 5 is a solenoidal coil having a central opening shaped in a rectangular form in order to permit the nonmagnetic substrate to pass therethrough and it is already known from U.S. Pat. No. 3,256,112. The generator is furnished with a cooling unit which is widely used so as not to overheat due to by long-term energization while generating a high magnetic field. Owing to the rectangular opening in the magnetic field generator, a horizontal and lower gradient magnetic field is obtained in the longitudinal direction on the nonmagnetic substrate which passes through the center. The magnetic field intensity is controlled by the current supplied to the units of the magnetic field generator.

The orientation system support rails 6 are installed horizontally parallel to the traveling surface of the non-magnetic substrate, and by moving the permanent magnet unit 4 and the magnetic field generator 5 on the rails, the time from the coating head to orientation process, and the intensity of the magnetic field between the magnets can be adjusted. The magnetic field generator used in the embodiment is capable of generating a maximum magnetic field of 8,000 Gauss, and it is designed have up to 10 units on the support rails. Such multi-stage magnetic field generator has been disclosed, for example, in the Japanese laid-open Patent No. 56-119938.

An air nozzle 7 is installed behind each orientation magnet, and the hot air from such a heated air supplier is blown onto the magnetic layer applied on the non-magnetic substrate. By controlling of the heated air supplier, the temperature and flow rate of the hot air blown out from the air nozzle can be adjusted.

EXAMPLE 1

As hard-to-orient magnetic powder, acicular metal magnetic powder with a coercive force of 1,570 Oe and an axial ratio of 9.5 was used. Properties of such magnetic powders are shown in Table 1, and the paint formulation when dispersed in organic binder is shown in Table 2. On the basis of the paint formulation shown in Table 2, the magnetic powder was sufficiently kneaded and dispersed by means of pressurized kneader and sand mill, and magnetic paint with the non-volatile ratio, i.e. the ratio of the non-volatile components to the total weight, of 35 wt. % was obtained.

The painting condition was set so that the dry thickness would be 2.9 μm on a 10 μm thick PET substrate, and orientation was carried out as shown in Table 3, which was followed by drying and calendering.

The following operation was conducted in order to obtain the orientation treating condition in Table 3 by employing the orientation equipment in the embodiment.

Spontaneous Drying Time

Adjusted by moving the setting position of the permanent magnet unit a the first stage of the orientation system back and forth on the supporting rails.

Maximum Magnetic Field Strength of First Orientation Step

Adjusted by the distance between confronting poles of the permanent magnets.

Maximum Magnetic Field Strength of Second Orientation Step

The maximum magnetic field intensity generated by each magnetic field generator was controlled by the current applied to the magnetic field generator.

Minimum Magnetic Field Strength of Second Orientation Step

The lowered magnetic field intensity between the magnets was controlled by changing the distance between magnets.

Application Time of Second Orientation Step

The magnetic field length of the entire orientation process was controlled by applying current to 10 magnetic field generators, starting from the one closest to the coating machine.

Thereafter by a 24-hour hardening treatment at 60° C., a back coat layer mainly composed of carbon black was applied in a thickness of 0.6 μm, and sample tapes A, B, C, D, E and F were prepared.

To compare with these sample tapes, other samples were prepared with orientation steps as shown in Table 4. These reference samples were prepared with the same material composition, magnetic paint formulation and coating method as in the embodiment.

Thus prepared samples were slit in a tape form, and the squareness ratio Br/Bm) of tape in the machine direction and surface smoothness of the magnetic layer were evaluated.

The results of evaluation are sequentially explained below.

Table 5 summarizes the squareness ratio of tape in machine direction and mean surface roughness of samples of embodiments and reference tapes in terms of the orientation condition. The squareness ratio was measured by VMS (vibrating sample magnetometer) apparatus by sweeping with a magnetic field of 10 k Oe, and the mean surface roughness wa measured by an optical interference type contact-free three-dimensional surface roughness meter.

It is seen from Table 5 that the greatest effect is achieved when the orientation conditions satisfy the following requirements:

(1) spontaneous drying time: 2.0 sec to 7.0 sec (2) magnetic field application time in first orientation step: within 0.5 sec when more than 3 times the magnetic powder coercive force (3) minimum magnetic field intensity in second orientation step: ½ or more of magnetic powder coercive force (4) application time in second orientation step: 2 sec (5) maximum magnetic field intensity in second orientation step: three to five times magnetic powder coercive force and a high squareness ratio of 0.86 or more in the tape machine direction and a superior surface smoothness of about 6 nm of mean surface roughness are both realized.

In samples G to L, V and W where both where high orientation and superior smoothness are not established both, the following reasons are main factors.

First in sample G, since the spontaneous drying time is short, disorder of orientation occurs after the orientation process, and in sample H with a longer spontaneous drying time orientation is fixed before the particles are properly oriented in the orientation process.

In sample I, since the maximum magnetic field intensity in the first orientation step is low, orientation of the magnetic particles with low axial ratio as employed in this embodiment is not sufficient.

To the contrary, in sample J with a strong maximum magnetic field intensity in the first orientation step, the time when exceeding 3 times the magnetic powder coercive force is more than 0.5 sec, a very high squareness ratio is obtained, but the magnetic layer is fluidized, which results in poor surface roughness.

In sample K, since the minimum magnetic field intensity in the second orientation step is too low, disorder of orientation of magnetic particles in this section cannot be suppressed sufficiently, and the final order of magnetic particles is lowered. Likewise, in sample L, since the application time in the second orientation step is short, disorder of orientation has occurred after the orientation process.

Paying attention to the maximum magnetic field intensity in the second orientation step in sample V whose maximum magnetic field intensity is less than three times magnetic powder coercive force, the squareness ratio is a little lower than that of samples B, V and W whose maximum magnetic field intensity is three times the magnetic powder coercive force or more. This shows that the force helping the once-oriented magnetic particles to begin disordering is reduced. On the contrary, in sample W whose maximum magnetic field intensity is more than five times magnetic powder coercive force, the surface roughness is big though the squareness ratio is good. This shows that magnetic particles begin to move because the magnetic field intensity is too strong.

Thus, when magnetic particles of small axial ratio which are hard to orient are used, in the orientation method of the reference example, a high order of the magnetic particles cannot be obtained because the condition for orientation processing is outside of the delicate setting for orienting with high precision. Alternatively if a high degree of orientation is achieved, the surface of the magnetic layer is roughened, which results in sacrifice of read/write characteristics in the high recording density region.

By contrast, in the embodiments according to the invention since the optimum method of orientation for obtaining a high order of magnetic particles is employed, while maintaining the surface roughness the tape characteristics obviously superior to those of references are obtained.

TABLE 1

|  | Acicular metal magnetic powder |
|---|---|
| BET specific surface area [m²/g] | 52 |
| Coercive force (Hc) [Oe] | 1570 |
| Saturated magnetism (Is) [emu] | 126 |
| Axial ratio (length/width) | 9.5 |

TABLE 2

| Magnetic powder | 100 parts by weight |
|---|---|
| Resin binder | 20 parts by weight |
| (Vinyl chloride | 10 parts by weight) |
| (Polyurethane | 10 parts by weight) |
| Aluminum oxide | 7 parts by weight |
| Carbon | 3 parts by weight |
| Lubricant | 4 parts by weight |
| (Myristic acid | 2 parts by weight) |
| (Stearic acid | 1 part by weight) |
| (n-Butyl stearate | 1 part by weight) |
| Hardener | 5 parts by weight |

The solvent formulation was adjusted to a mixing ratio of methylethylketone:-toluene:cyclohexane = 3:3:1.

TABLE 3

| | Orientation condition when preparing samples | | | | |
|---|---|---|---|---|---|
| | Non-orientation process | First orientation process | Second orientation process | | |
| | Non-orientation time: T | Time of 3 Hc or more | Min magnetic field: H min | Application time: t | Max magnetic field: H max |
| A | 2.0 sec | 0.1 sec (MAX: 3.2 Hc) | 0.51 Hc (800 Gauss) | 2.0 sec | 3.2 Hc (5,020 Gauss) |
| B | 5.0 sec | 0.1 sec (MAX: 3.2 Hc) | 0.51 Hc (800 Gauss) | 2.0 sec | 3.2 Hc (5,020 Gauss) |
| C | 7.0 sec | 0.1 sec (MAX: 3.2 Hc) | 0.51 Hc (800 Gauss) | 2.0 sec | 3.2 Hc (5,020 Gauss) |
| D | 5.0 sec | 0.3 sec (MAX: 4.8 Hc) | 0.51 Hc (800 Gauss) | 2.0 sec | 3.2 Hc (5,020 Gauss) |

TABLE 3-continued

| | Orientation condition when preparing samples | | | | |
|---|---|---|---|---|---|
| | Non-orientation process | First orientation process | Second orientation process | | |
| | Non-orientation time: T | Time of 3 Hc or more | Min magnetic field: H min | Application time: t | Max magnetic field: H max |
| E | 5.0 sec | 0.1 sec (MAX: 3.2 Hc) | 1.0 Hc (1,600 Gauss) | 2.0 sec | 3.2 Hc (5,020 Gauss) |
| F | 5.0 sec | 0.1 sec (MAX: 3.2 Hc) | 0.51 Hc (800 Gauss) | 10.0 sec | 3.2 Hc (5,020 Gauss) |
| U | 5.0 sec | 0.1 sec (MAX: 3.2 Hc) | 0.51 Hc (800 Gauss) | 2.0 sec | 4.9 Hc (7,690 Gauss) |

TABLE 4

| | Orientation condition | | | | |
|---|---|---|---|---|---|
| | Non-orientation process | First orientation process | Second orientation process | | |
| | Non-orientation time: T | Time of 3 Hc or more | Min magnetic field: H min | Application time: t | Max magnetic field: H max |
| G | 1.5 sec | 0.1 sec (MAX: 3.2 Hc) | 0.51 Hc (800 Gauss) | 2.0 sec | 3.2 Hc (5,020 Gauss) |
| H | 7.5 sec | 0.1 sec (MAX: 3.2 Hc) | 0.51 Hc (800 Gauss) | 2.0 sec | 3.2 Hc (5,020 Gauss) |
| I | 5.0 sec | 0.0 sec (MAX: 2.9 Hc) | 0.51 Hc (800 Gauss) | 2.0 sec | 3.2 Hc (5,020 Gauss) |
| J | 5.0 sec | 0.6 sec (MAX: 5.1 Hc) | 0.51 Hc (800 Gauss) | 2.0 sec | 3.2 Hc (5,020 Gauss) |
| K | 5.0 sec | 0.1 sec (MAX: 3.2 Hc) | 0.3 Hc (470 Gauss) | 2.0 sec | 3.2 Hc (5,020 Gauss) |
| L | 5.0 sec | 0.1 sec (MAX: 3.2 Hc) | 0.51 Hc (800 Gauss) | Approx. 1.5 sec | 3.2 Hc (5,020 Gauss) |
| V | 5.0 sec | 0.1 sec (MAX: 3.2 Hc) | 0.51 Hc (800 Gauss) | 2.0 sec | 2.9 Hc (4,550 Gauss) |
| W | 5.0 sec | 0.1 sec (MAX: 3.2 Hc) | 0.51 Hc (800 Gauss) | 2.0 sec | 5.1 Hc (8,010 Gauss) |

EXAMPLE 2

In order to evaluate the effect of the use of an air nozzle, the effect of hot air blow from an air nozzle installed behind each magnet unit on the orientation condition of sample B was studied. Setting the temperature and air flow of the air nozzle as shown in Table 6, samples M to T were prepared. In each condition, the air nozzle interval was identical.

In these samples, the squareness ratio in the tape machine direction and surface roughness were measured the same as in Example 1, and the results are shown in Table 6, together with the blowing conditions. As seen from Table 6, by properly blowing hot air on the coated layer from the air nozzle installed behind each magnet unit, the effect of the invention can be further enhanced.

As the setting of the air nozzle, from these experimental results, it is found that the greatest effect is obtained at an air flow rate of 7 to 25 m³/min at a temperature of 50° to 100° C. at the nozzle outlet. If the temperature is lower or air flow is smaller, the effect is not observed, or on the higher temperature or larger air flow side, the surface of the coated layer is roughened.

EXAMPLE 3

By contrast to sample N in the embodiment showing the maximum effect, the following comparison samples were prepared.

In the oven closest to the coating head of the standard coating machine used generally, six magnetic field generators of the same capacity as used in Examples 1 and 2 were installed, and orientation was performed while drying powerfully in the magnetic field at an intensity of 6k Gauss, which was comparison sample 1.

A hot air blower was installed between the same coating head as in the same used machine in comparison sample 1 and the first oven, and hot air at 80° C. was blown to dry preliminarily, and orientation was performed at 6k Gauss while drying conventionally, which was comparison sample 2.

The results of the squareness ratio and surface roughness of these comparison samples and sample N are shown in Table 7.

In comparison sample 1, since an abrupt drying condition more than usual was created, although the orientation is similar to the embodiment, the surface roughness is great, and excellent surface smoothness as in the embodiment was not achieved.

In comparison sample 2, the surface property and orientation are both balanced in the air flow, but both orientation and surface roughness were not superior as in the embodiment.

As shown in the embodiment herein, even with the hard-to-orient magnetic powder with a short axial ratio and a large coercive force, by applying the invention, superior orientation performance and surface smoothness not achieved in the prior art can be realized.

In this embodiment, as the orientation system, a rare earth permanent magnet and a magnetic field generator were combined, but this is not limitative, and only permanent magnets or only magnetic field generators may be used for achieving the orientation method of the invention and the magnetic field generator is not limited only to a solenoidal type.

The constituent materials of the magnetic layer, and the technique for dispersing in organic binders and forming the tape are not limitative, and the effects of the invention can be obtained by using any other materials or methods as far as the materials, paint formulation method or painting method are capable of producing coated magnetic tapes.

TABLE 6

| | Air blow condition | | Tape characteristics | |
|---|---|---|---|---|
| Sample | Temperature (°C.) | Air flow rate (m/min) | Squareness ratio Br/Bm | Surface roughness R ms (nm) |
| B | — | — | 0.89 | 6.21 |
| M | 40 | 15 | 0.89 | 6.21 |

TABLE 6-continued

| | Air blow condition | | Tape characteristics | |
| --- | --- | --- | --- | --- |
| Sample | Temperature (°C.) | Air flow rate (m/min) | Squareness ratio Br/Bm | Surface roughness R ms (nm) |
| N | 80 | 15 | 0.91 | 6.25 |
| O | 120 | 15 | 0.91 | 8.23 |
| P | 80 | 5 | 0.89 | 6.22 |
| Q | 80 | 10 | 0.90 | 6.23 |
| R | 80 | 20 | 0.91 | 6.28 |
| S | 80 | 25 | 0.91 | 6.59 |
| T | 80 | 30 | 0.91 | 8.53 |

TABLE 7

| Sample | Squareness ratio (Br/Bm) | Surface roughness (nm) |
| --- | --- | --- |
| Sample N | 0.91 | 6.25 |
| Comparison sample 1 | 0.90 | 8.43 |
| Comparison sample 2 | | |
| Air flow; Small | 0.81 | 6.42 |
| Medium | 0.86 | 7.13 |
| Large | 0.83 | 7.56 |

What is claimed is:

1. A method of producing a coated type magnetic recording medium, comprising:
    a step of coating a nonmagnetic substrate with a magnetic paste layer mainly composed of acicular or granular magnetic particles and a resin binder to obtain a coated magnetic layer;
    a step of spontaneously drying the coated magnetic layer for a specific time within a range from 2 to 7 seconds without applying a magnetic field from outside to induce leveling of a surface of the coated magnetic layer and spontaneous vaporization of a solvent;
    a first orientation step of, in a first orientation zone, applying to the coated magnetic layer a DC magnetic field having an intensity which is at least three times the coercive force of the magnetic particles for no more than 0.5 seconds and in a longitudinal direction of the medium to dissipate aggregated magnetic particles by a sudden change in magnetic field and to induce magnetic moment in the magnetic particles; and
    providing a second orientation zone having a magnetic field intensity which changes in the direction of the length of said second orientation zone by generating by a plurality of magnetic field generators positioned along the length of said zone and each having a solenoid coil a plurality of same direction DC magnetic fields;
    carrying out a second orientation step of, in said second orientation zone, first applying to the coated magnetic layer a DC magnetic field having an intensity of at least one-half to three times the coercive force of the magnetic particles, and then applying to the coated magnetic layer a DC magnetic field having an intensity of from three to five times the coercive force of the magnetic particles, the duration of the application in said second orientation step being for two seconds or longer and in the same direction as in the first orientation step to suppress magnetic repulsive force among the magnetic particles and to orient the magnetic particles in the longitudinal direction of the medium.

2. A method according to claim 1, further comprising providing a plurality of air nozzles between the end of the first orientation step and the end of the second orientation step; and the viscosity of the coated layer is raised by blowing hot air onto the coated surface through said nozzles at a temperature and a flow rate which are insufficient to roughen the coated surface by drying.

3. A method according to claim 1, wherein three to ten air nozzles are provided, and the temperature of the air from each air nozzle is 50° C. to 100° C., and the air flow rate from each air nozzle is 7-25 m³/min.

4. A method according to claim 1, wherein the thickness of the spontaneously dried coating is 1.0 μm to 5.0 μm, and a non-volatile ratio of the magnetic paint at coating is 25% to 45%.

5. A method according to claim 1, wherein the magnetic particles are mainly ferromagnetic alloy particles with an axial ratio of 5-14.

* * * * *